US 6,719,392 B2

(12) United States Patent
Qiao

(10) Patent No.: US 6,719,392 B2
(45) Date of Patent: Apr. 13, 2004

(54) OPTIMIZED COLOR RANGES IN GAMUT MAPPING

(75) Inventor: Yue Qiao, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/028,376

(22) Filed: Dec. 20, 2001

(65) Prior Publication Data

US 2003/0117457 A1 Jun. 26, 2003

(51) Int. Cl.[7] .................... B41J 2/205; H04N 1/46; G06K 9/36
(52) U.S. Cl. .................... 347/15; 358/515; 358/523; 382/166
(58) Field of Search .................... 347/15, 43; 358/523, 358/515, 516, 518, 520, 539; 382/166, 162, 167

(56) References Cited

U.S. PATENT DOCUMENTS

| | | |
|---|---|---|
| 5,450,216 A | 9/1995 | Kasson |
| 5,510,910 A | 4/1996 | Bockman et al. |
| 5,563,724 A | 10/1996 | Boll et al. |
| 5,611,030 A | 3/1997 | Stokes |
| 5,734,802 A | 3/1998 | Maltz et al. |
| 6,005,968 A | 12/1999 | Granger |
| 6,023,527 A | 2/2000 | Narahara |
| 6,088,038 A | 7/2000 | Edge et al. |
| 6,101,272 A | 8/2000 | Noguchi |
| 6,128,022 A | 10/2000 | Dillinger |
| 6,151,136 A | 11/2000 | Takemoto |
| 6,154,217 A | 11/2000 | Aldrich |
| 6,362,808 B1 * | 3/2002 | Edge et al. ........ 345/601 |
| 6,633,668 B1 * | 10/2003 | Newman ........ 382/166 |

FOREIGN PATENT DOCUMENTS

| | | |
|---|---|---|
| EP | 488655 A2 | 6/1992 |
| EP | 488656 A2 | 6/1992 |
| EP | 828381 A2 | 3/1998 |
| EP | 961488 | 12/1999 |
| JP | 08275007 | 10/1996 |
| JP | 11317883 | 11/1999 |
| JP | 11341296 | 12/1999 |
| JP | 2000184225 | 6/2000 |

* cited by examiner

Primary Examiner—Lamson Nguyen
(74) Attorney, Agent, or Firm—Scott W. Reid; Jose Gutman; Fleit, Kain, Gibbons, Gutman, Bongini & Bianco P.L.

(57) ABSTRACT

A method finds the color gamut of a source device and a destination device in their device-dependent color spaces, converts each color gamut to a device-independent color space, compares the color gamut of the source device to the color gamut of the destination device in the device-independent color space, and finds an optimized intermediate color range in the device-independent color space. Then, the method maps the colors from the color gamut of the source device in the device-independent color space to the optimized intermediate color range using a first gamut-mapping algorithm, maps the colors inside the optimized intermediate color range to the color gamut of the destination device in the device-independent color using a second gamut-mapping algorithm, and converts the colors in the color gamut of the destination device in the device-independent color space back to the color gamut of the destination device in the device-dependent color space.

19 Claims, 8 Drawing Sheets

OPTIMIZED COLOR RANGES IN GAMUT MAPPING

BACKGROUND OF THE INVENTION

1. Field of the Invention

This invention generally relates to the field of printer systems, and more particularly relates to a system and method for optimizing color ranges in gamut mapping.

2. Description of Related Art

In color printing, displaying, or reproduction, the term gamut represents the set of all colors that a color-reproduction device is physically able to generate. Every device that displays or reproduces an image, such as a printer, monitor, scanner, or digital camera, may have its own unique color gamut. When an image is transferred from one device to another, the color gamut of each device must be examined.

The color gamut set has two components that need to be considered: The gamut boundary and the number of colors that are realizable within the gamut boundary. The gamut boundary of a device represents the outermost extent of the device's capabilities in some reference color space. Because of quantization in color reproduction systems, such as digital halftone devices (color halftone printers), not all colors that are within a device's boundary are realizable. The shape and extent of this volume are generally a function of the device primaries and the viewing environment under which the reproductions are observed. Significant differences can exist between the gamut produced by color imaging systems that utilize different primaries and viewing environments.

When the input color space is bigger than the gamut of the output color device, then gamut-mapping algorithms need to be applied. The gamut mapping process transforms a point in the source gamut to a realizable color inside the gamut of the output device. The form of this transformation can dramatically impact the quality of the reproduced images. As such, care needs to be used in the design and implementation of gamut mapping transformations.

All the current gamut-mapping algorithms are so-called "one-step" gamut mapping, i.e., map all out-of-gamut points directly to the destination gamut. The most typical gamut mappings are (1) Clipping algorithms: to clip of out-of-gamut points to the destination gamut boundary, and (2) Scaling algorithms: to scale the input color gamut to output color gamut, i.e., some out-of-gamut points are mapped to inside of the destination gamut, some out-of-gamut points are mapped to the boundary of the destination gamut.

The large variability in past color gamut mapping studies suggests that ideal gamut mapping depends on image content, preservation of perceived hue throughout color space, and the extent of the gamut mismatch in various regions of color space. Image dependent and regional-dependent gamut mappings are preferred. However, image dependent gamut mapping algorithms suffer a performance penalty.

Perceptual gamut mapping is a widely used mapping algorithm in color reproduction. It modifies both in-gamut and out-of-gamut colors from their colorimetric representation in order to provide a pleasing or perceptual appearance. The results of the perceptual gamut mapping normally depend on the input color range and the device color gamut. If the input color range is much bigger than the actual output color range (e.g., images from digital camera, scanner . . . ), the reproduced colors through perceptual color gamut mapping will have lower chroma, and are intended to be less vivid. Moreover, the chroma contrast is significantly reduced. Thus, it decreases the image quality of reproduction. This problem is especially worse for high-end color printers with relatively small color gamut.

Therefore a need exists to overcome the problems with the prior art as discussed above, and particularly for a method of optimizing color ranges in gamut mapping.

SUMMARY OF THE INVENTION

According to a preferred embodiment of the present invention, a method finds the color gamut of a first device and a second device in their device-dependent color spaces, converts each color gamut to a device-independent color space, compares the color gamut of the first device to the color gamut of the second device in the device-independent color space, and finds an optimized intermediate color range in the device-independent color space. Then, the method maps the colors from the color gamut of the first device in the device-independent color space to the optimized intermediate color range using a first gamut-mapping algorithm, maps the colors inside the optimized intermediate color range to the color gamut of the second device in the device-independent color using a second gamut-mapping algorithm, and converts the colors in the color gamut of the second device in the device-independent color space back to the color gamut of the second device in the device-dependent color space.

DESCRIPTION OF THE PREFERRED EMBODIMENTS

The present invention, according to a preferred embodiment, overcomes problems with the prior art by finding an optimized intermediate color range, and dividing typical one-step gamut mappings into two steps. The first step is to map input device-dependent color data to this optimized intermediate color range; the second step is to map the data within the intermediate range to the output device gamut. The optimized intermediate color range is a three dimensional surface which lies inside the source gamut boundary in a device-independent color space such as CIELab (the human perception color space) or CIELCH (a spherical form of CIELab). The output is device-gamut dependent. Typical device-gamut dependent color spaces include RGB (Red Green Blue) or CMYK (Cyan Magenta Yellow Black).

Additionally, this process can be taken further to allow gamut-mapping to several optimized intermediate color ranges in order to insure the best color map for each color.

This method is general enough that can be applied to all types of gamut mappings in color management system. Unlike current gamut mapping methods, the method of the present invention helps to preserve the color image contrast, lightness, and hue throughout the color space. This method significantly improves the color accuracy in an image-independent manner, and yet has no performance tradeoffs found in image-dependent approach. Thus, it is more practical for the color industry.

This method works best for generating lookup tables for output devices, especially for printers with small color gamuts. In this case, the color range of a lookup table is normally defined for encoding practice, e.g., in CIELAB color space, L:0–100, a*:−128 to +127, b*:−128 to +127. There are lots of colors in the table entries do not exist, e.g., L*=100, a*=100, b=−128. There are also colors with this input range that are not likely to be produced by common input devices. If the output device color gamut is small, there are significant amounts of colors that are outside the output device color gamut. If these colors are mapped using typical perceptual color gamut mapping method (scaling), the contrast of the output image will be severely decreased. The solution to this problem is to define an intermediate range based on the following factors:

1. Human perception of tolerances of big color differences for different hue angles and lightness levels throughout the color space: i.e. the smaller intermediate range can be psychophysically determined based on the acceptable color differences for the input color range. For example, a yellow color (L*=50, a*=0, b*=128) in the input range might be mapped to a color (L*=50, a*=0, b*=60) with an acceptable color match.

2. Color gamut/dynamic range of common input color devices.

3. Color gamut of output devices.

Figure 1:
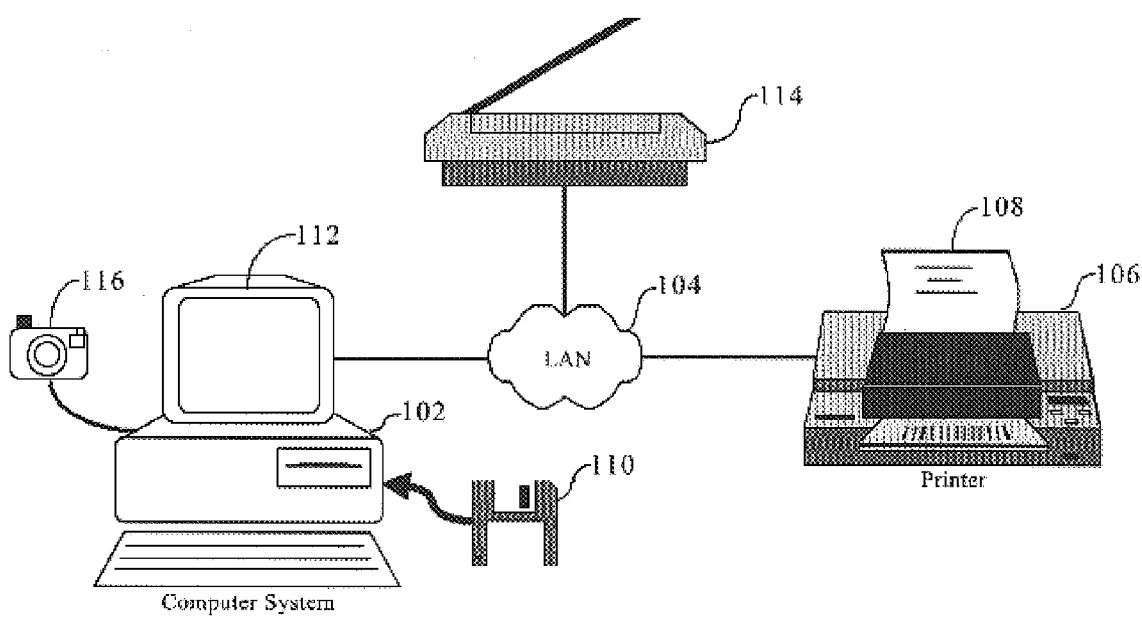
FIG. 1 is a block diagram illustrating an optimized color range gamut-mapping system in accordance with a preferred embodiment of the present invention.

FIG. 1 illustrates an exemplary optimized color range gamut-mapping system according to a preferred embodiment of the present invention. The optimized color range gamut-mapping system 100 includes a printer 106 communicatively coupled to a computer system 102 via a local area network interface 104. The local area network interface 104 may be a wired communication link or a wireless communication link. The printer 106 may also be communicatively coupled with the world-wide-web, via a wide area network interface (not shown) via a wired, wireless, or combination of wired and wireless local area network communication links 104. Alternatively, the printer 106 may also be communicatively coupled locally to the computer system 102. The optimized color range gamut-mapping system may also include a scanner 114 and/or a digital camera 116 communicatively coupled to the computer system 102 via the local area network interface 104.

Each computer system 102 may include, inter alia, one or more computers, a display monitor 112, and at least a computer readable medium 110. The computers preferably include means for reading and/or writing to the computer readable medium. The computer readable medium allows a computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Figure 2:
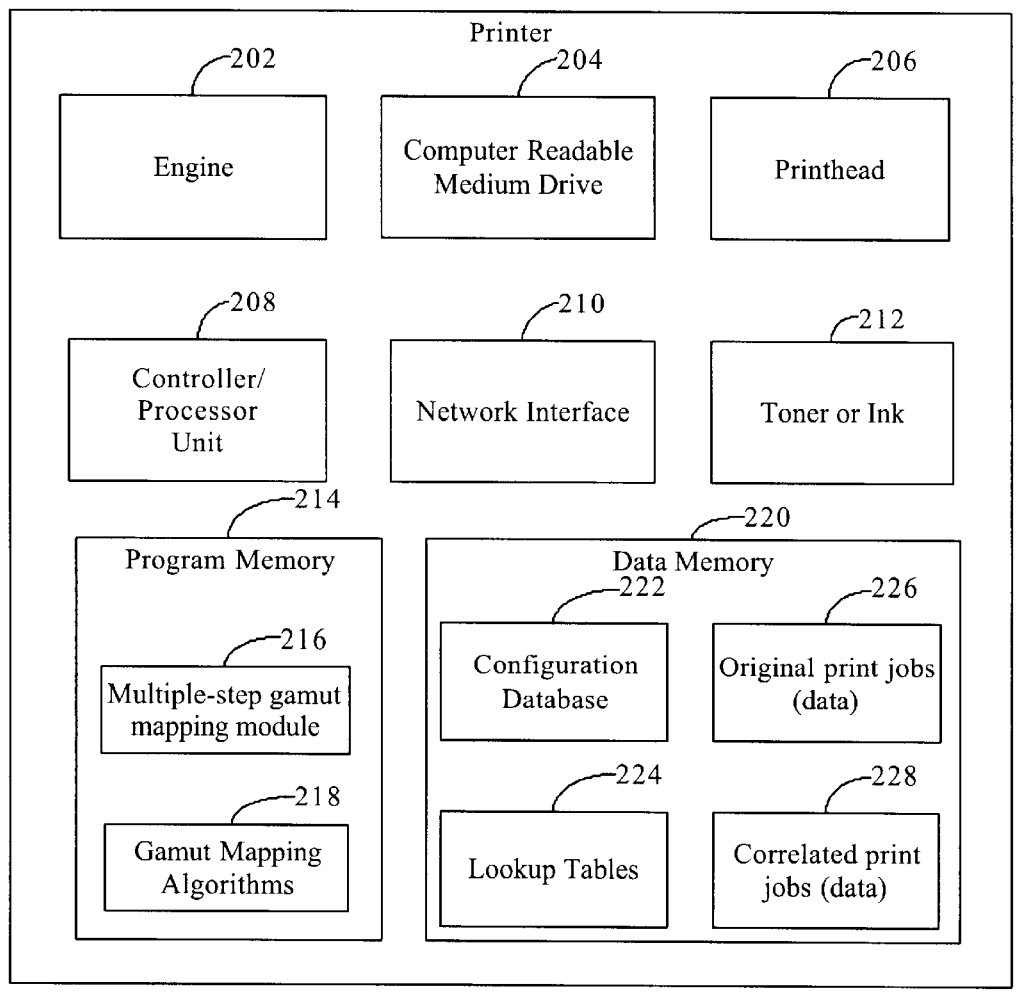
FIG. 2 is a more detailed block diagram showing a printer in the system of FIG. 1, according to a preferred embodiment of the present invention.

FIG. 2 illustrates a printer 106, according to the present example, that includes a controller/processor unit 208, which processes instructions, performs calculations, and manages the flow of information through the printer 106. Additionally, the controller/processor 208 is communicatively coupled with program memory 214. Included within program memory 214 are gamut-mapping algorithms 218 and a multiple-step gamut mapping module 216 (which will be discussed later in greater detail). The controller/processor unit 208 manages resources, such as the data stored in data memory 220, the scheduling of tasks, the operation of the printer engine 202, and processes the operation of the gamut-mapping algorithms 218 and multiple-step gamut-mapping module 216 in the program memory 218. The controller/processor unit 208 may also manage a communication network interface 210 for communicating with the network link 104, a computer-readable medium drive 204, and a printhead 206. Additionally, the controller/processor unit 208 also manages many other basic tasks of the printer 106 in a manner well known to those of ordinary skill in the art.

In a preferred embodiment, the print engine 202 is communicatively coupled to the controller/processor unit 208. The print engine 202 may include a printhead 206, which is used to apply toner or ink 212 to paper 108. Data memory 220 is communicatively coupled to the controller/processor unit 208 and may contain a document queue of original print jobs 226, lookup tables 224, correlated documents 228 and a configuration database 222.

Although a printer system 106 is described in detail, the methods described in the present invention may also be included in a scanner 114, a display monitor 112, a digital camera 116, a video capable telephone, a television, a personal digital assistant or any other imaging device which uses a color gamut, These devices use the methods described herein to optimally transfer images from a source (or input) device to a destination (or output) device. Traditionally, typical source devices could include a scanner 114 or a digital camera 116, while destination devices could be such devices as a printer 106, a display monitor 112, or a television. Recently, devices such as video capable telephones and personal digital assistants have stretched the boundaries between devices used strictly as input or output devices. These devices and other devices that integrate a number of functions into one device make It conceivable that any of the above mentioned devices could be used as either a source and/or a destination device. Alternatively, the instructions for performing these methods may be contained in the memory of a general-purpose computer system 102.

Figure 3:
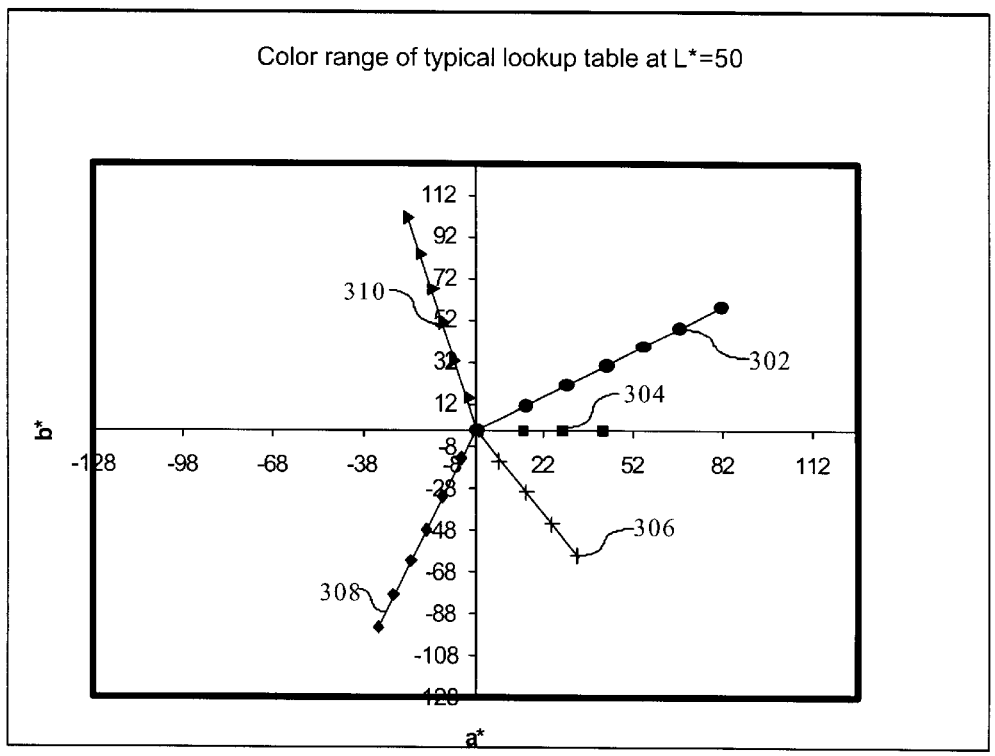
FIG. 3 is a graph displaying an exemplary color range of a typical lookup table for a specific lightness level.

The most used device-independent color spaces in gamut mapping are CIELab and CIELCH (LCh). FIG. 3 represents the color range of a typical lookup table for the CIELab standard at L*=50. For the CIELab standard, L* is lightness, a* is red-green (−a is green, +a is red), and b* is yellow-blue (−b is blue, and +b is yellow).

In the graph of FIG. 3, an orange line 302 is represented by circles, a red line 304 is represented by squares, an indigo line 306 is represented by crosses, a turquoise line 308 is represented by diamonds, and an olive green line 310 is represented by triangles. CIELCH(ICh) is a spherical form of CIELab, where $$C^*_{ab} = \sqrt{a^* \times a^* + b^* \times b^*}$$

is called chroma, and $$h_{ab} = \arctan(b^*/a^*)$$

is called hue angle.

Figure 4:
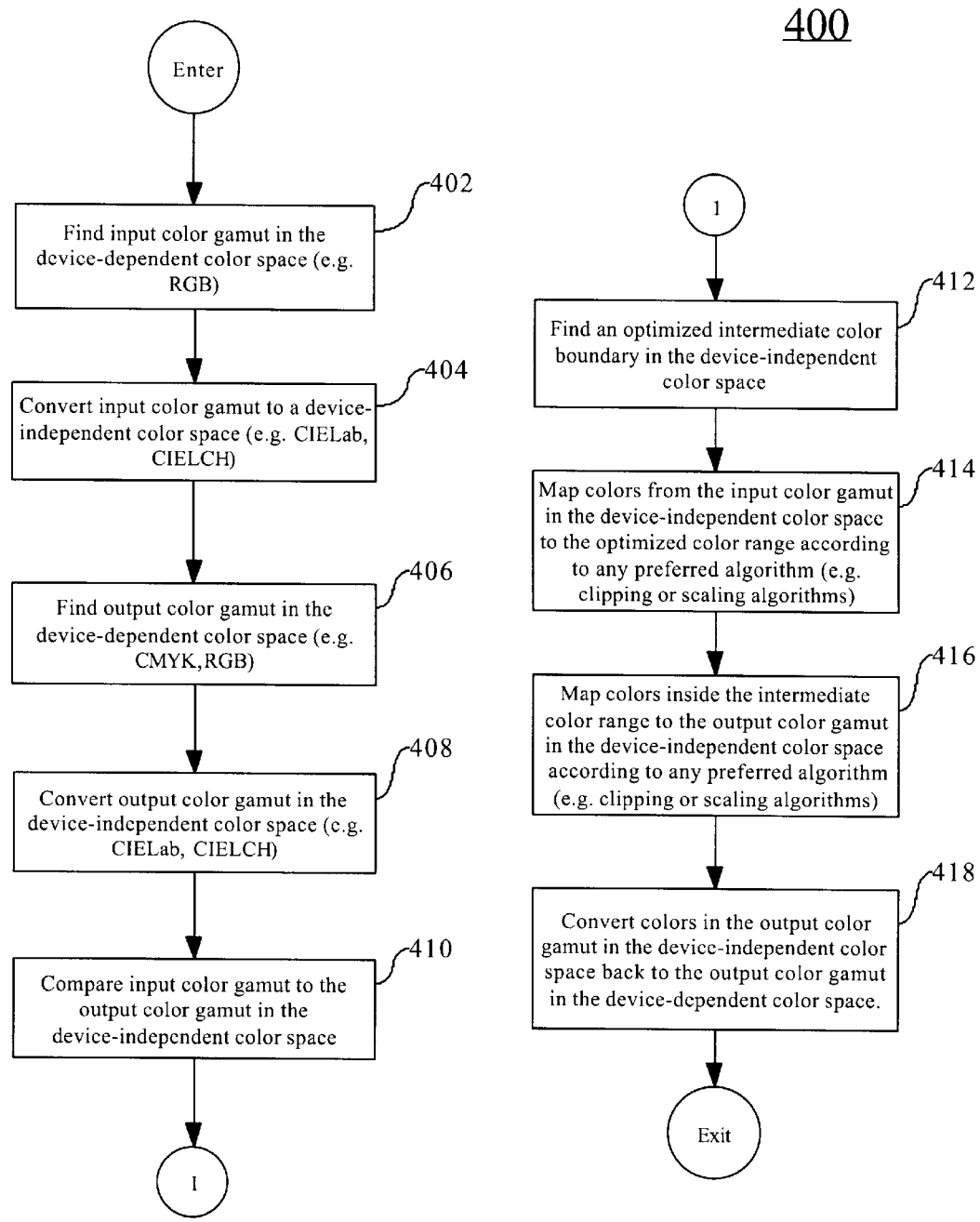
FIGS. 4, 5, and 6 are operational flow diagrams illustrating exemplary operational sequences for the system of FIG. 1, according to a preferred embodiment of the present invention.
Figure 5:
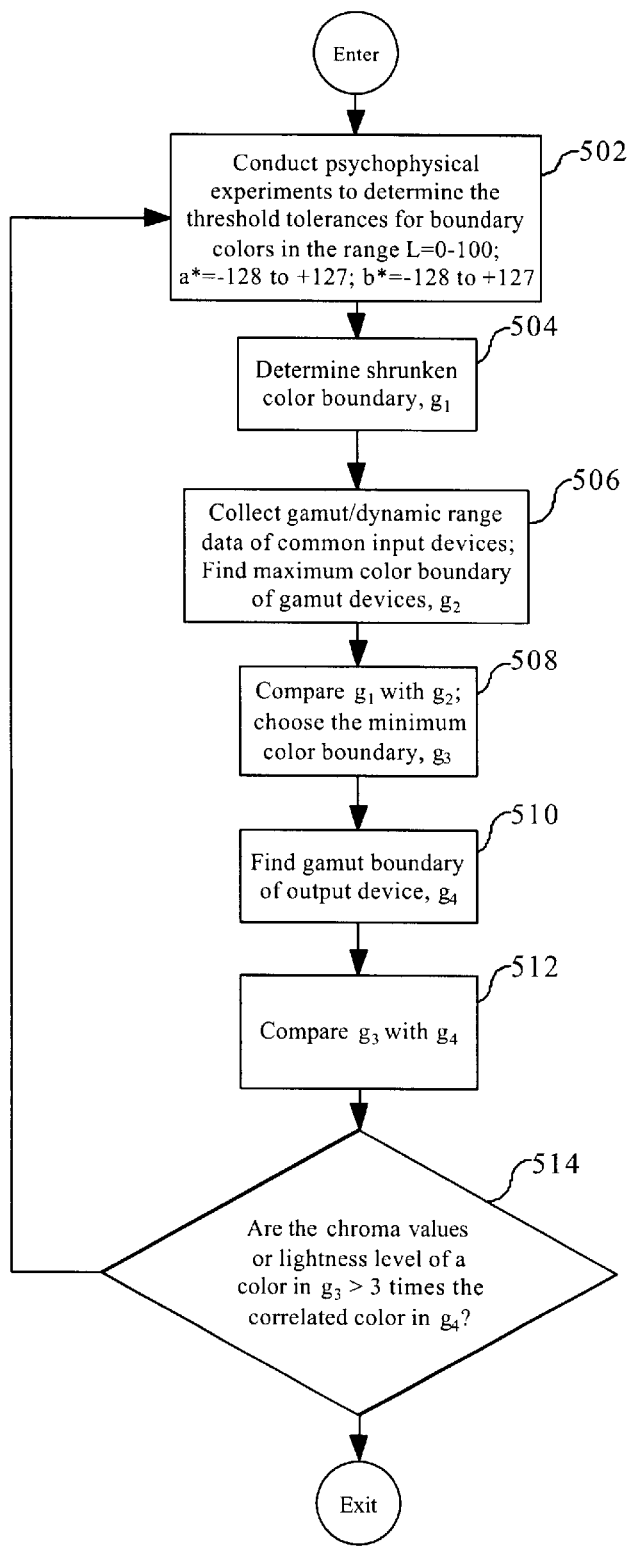
Figure 6:
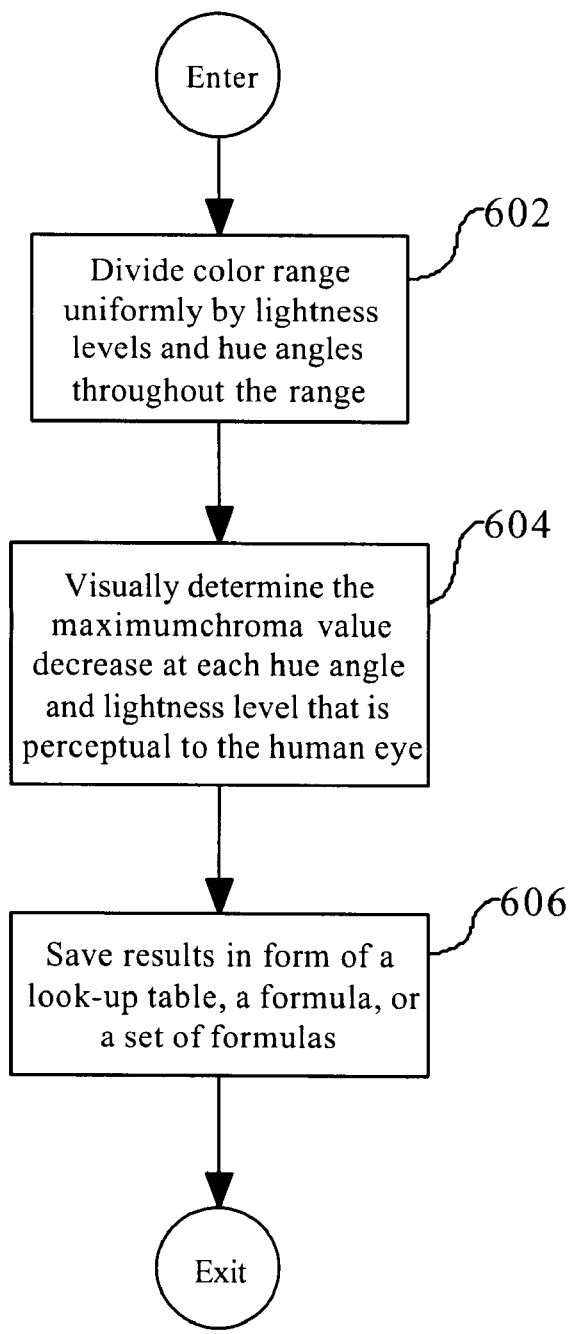

FIGS. 4, 5 and 6 are operational flow diagrams illustrating exemplary operational sequences for the system of FIG. 1. The system enters the sequence at step 402, wherein the multiple-step gamut-mapping module 216 finds the input color gamut of an input device in its device dependent color space (e.g. RGB or CMYK). The input color gamut, at step 404, is converted to a device-independent color space (e.g. CIELab, CIELCH). At step 406, the output color gamut is found in the device-dependent color space (e.g. CMYK, RGB). The output color gamut, at step 408, is converted to the same device-independent color space as the input color space was converted in step 404. The input color gamut and the output color gamut are compared in the device-independent color space, at step 410, to determine an optimized intermediate color boundary in the device-independent color space at step 412 (more detail about this step to follow). The colors from the input color gamut in the device-independent color space are mapped to the optimized intermediate color range according to any preferred gamut-mapping algorithm 218 at step 414. Preferred gamut-mapping algorithms 218 may include clipping or scaling algorithms. Additionally, it should be noted that within each step, different gamut mapping algorithms could be applied to different color regions. Next, at step 416, the colors of the optimized intermediate color range are mapped to the output color gamut in the device-independent color space. Finally, at step 418, the colors of the output color gamut in the device-independent space are converted back to the output color gamut in the device-dependent color space.

FIG. 5 is an exemplary operational flow diagram for determining the optimized intermediate color boundary in the device-independent color space of step 412. Psychophysical experiments are conducted, at step 502 (psychophysical experiments will be discussed later in more detail), to determine the threshold tolerances for boundary colors in the range L=0–100; a*=−128 to +127; and b*=−128 to +127. At step 504, the shrunken color boundary, $g_1$, is determined and saved to a lookup table 224. At step 506, the gamut/dynamic range data of common input devices, (e.g., digital camera, scanner . . . ) is collected and the maximum color boundary of common devices, $g_2$, is found. At step 508, $g_1$ is compared with $g_2$ to find the minimum color boundary, $g_3$. Next, at step 510, the gamut boundary of the output device, $g_4$, is found. At step 512, $g_4$ is compared with $g_3$. If certain regions in $g_3$ are still much bigger than $g_4$, (e.g., the chroma value of a color at certain hue angle and lightness level in $g_3$ is 3–4 times larger than the correlated color in $g_4$), then the color range in $g_3$ should be further compressed at these regions at step 514. Psychophysical experiments need to be conducted further if step 514 is true. Alternatively, when the output gamut is still much smaller than the optimized color range, another intermediate color range(s) based on psychophysical experiments may be defined. Also, several color ranges can be developed for the purpose of applying different gamut mapping algorithms. This enables multiple-step gamut mapping in order to ensure that every color outside the output device gamut maps to the exact expected point in the output gamut to achieve the best perceptual color reproduction quality.

The degree of color values compressed will be decided by the results of psychophysical evaluations and related psychophysical parameters, which correlate the degree of the compression with the quality of reproduction. The number correlated to the best quality should be chosen such as from pre-determined psychophysical parameters. Preliminary tests indicate that the ratio of optimized color range to the output color boundary should be less than 2, and the shape of optimized color range should be similar to the shape of output-device gamut boundary. Saturated colors around hue angle 90°, 180°, 270°, and 315° can be compressed more in chroma since they are not very sensitive in the changes in chroma.

FIG. 6 is an exemplary operational flow diagram for conducting the psychophysical experiments of step 502. First, at step 602, the color range is divided uniformly by different lightness levels and different hue angles throughout the range. Hue angles can be calculated in CIELAB color space, and also can be calculated with hue-linearized CIELAB color spaces. At step 604, the maximum chroma value decrease at each hue angle and lightness level that human eyes find the color match just acceptable is visually determined. This process determines the shrunken color boundary, $g_1$. The results of the psychophysical experiments, at step 606, should be saved in the format of a lookup table, a formula, or a set of formulas in the device dependent color space (e.g., CIELab color space or CIELCH color space). If results are saved as a lookup table, proper interpolation algorithms (e.g., tri-linear interpolation, tetrahedral linear interpolation, or nonlinear interpolations) should be applied to determine $g_1$.

Figure 7:
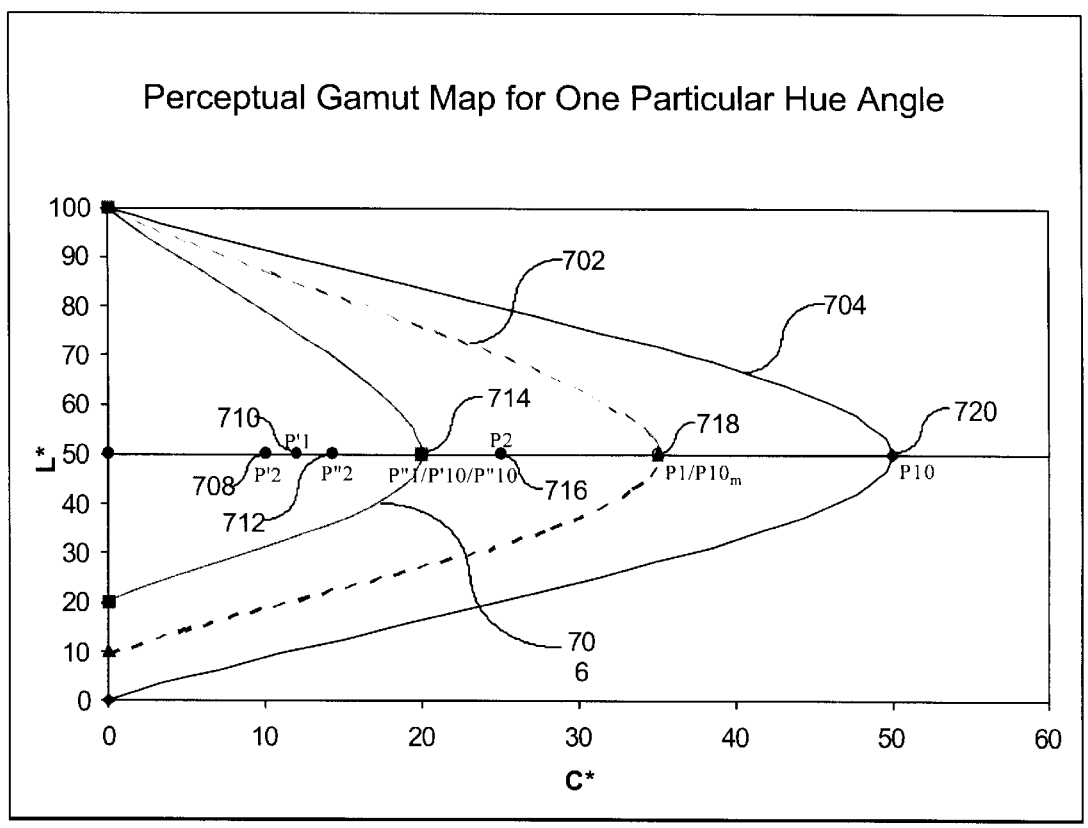
FIG. 7 is a graph displaying an exemplary perceptual gamut map for one particular hue angle.

FIG. 7 is a graph displaying an exemplary perceptual gamut map for one particular hue angle. It demonstrates the invention idea applied to a perceptual color gamut mapping technique. In typical one-step gamut mapping, the points in the input color range 704 would be mapped directly to the destination color range 706. However, with the present invention, the input color range 704 is mapped first to an intermediate color range 702, and then mapped again to the destination color range. P10 720, P1 718, and P2 716 are the out-of-gamut points in the input color range 704. P'1 710, P'2 708, and P'10 714 are the final mapped points with typical one-step perceptual gamut mapping. P"1 714, P"2 712, and P"10 714 are the final points with the perceptual gamut mapping of current invention idea. $P10_m$ 718 is the point that mapped from P10 720 to the intermediate color range 702 with current invention idea. The graph clearly shows that the color contrast and accuracy has been significantly improved with the present invention.

Figure 8:
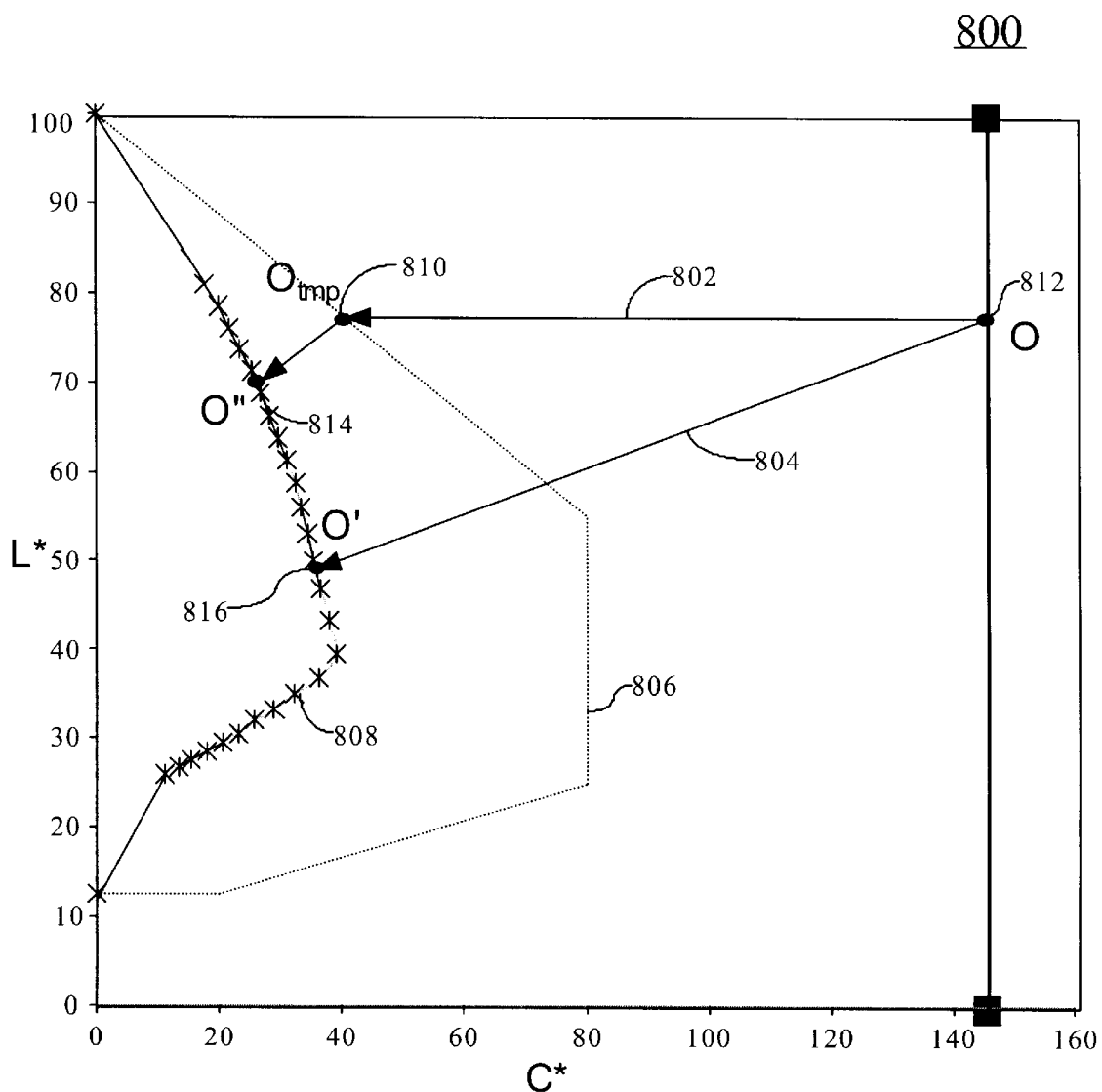
FIG. 8 is a graph illustrating exemplary results of one-step gamut mapping compared to two-step gamut mapping for clipping algorithms.

In color reproduction, the most important factors are the correctness of hue, and the correctness of lightness. FIG. 8 is a graph illustrating exemplary results of two-step gamut mapping compared to one-step gamut mapping for clipping algorithms. Point O 812 is a color with L*=75, C*=145, h=330. With one-step minimum-distance cusp clipping algorithm, O 812 is mapped to O' 816 on the output gamut boundary 808 with L*=50, C*=36, h=360. But with proposed 2-step clipping algorithm, O 812 first is mapped to $O_{tmp}$ 810 on the optimized color range 806 with constant-lightness clipping, and it is mapped to O" 814 with minimum-distance cusp clipping. The resulting color is L*=70, C*=28, h=330. Since human eyes are not as sensitive in chroma changes as in lightness changes, the result color with 2-step clipping is much more perceptually accurate than that with 1-step clipping.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

A preferred embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
   finding a color gamut of a source device in a device-dependent color space;
   converting the color gamut of the source device to a device-independent color space;
   finding a color gamut of a destination device in a device-dependent color space;
   converting the color gamut of the destination device to a device-independent color space;
   comparing, in the device-independent color space, the color gamut of the source device to the color gamut of the destination device; and
   determining at least one optimized intermediate color range in the device-independent color space for mapping color information from the source device to the destination device.

2. The method of claim 1, wherein the color gamut of the source device in the device-independent color space is an entry in a predetermined lookup table.

3. The method of claim 1, further comprising the step of:
   dividing the color gamut of the source device into multiple color regions.

4. The method of claim 3, further comprising the steps of:
   mapping color information from the color gamut of the source device in the device-independent color space to the at least one optimized intermediate color range using a first gamut-mapping algorithm;
   mapping color information from the at least one optimized intermediate color range to the color gamut of the destination device in the device-independent color space using a second gamut-mapping algorithm; and
   converting colors in the color gamut of the destination device in the device-independent color space to the color gamut of the destination device in the device-dependent color space.

5. The method of claim 3, further comprising the steps of:
   mapping color information from the color gamut of the source device in the device-independent color space to the at least one optimized intermediate color range using a particular gamut-mapping algorithm for each color region;
   mapping color information from the at least one optimized intermediate color range to the color gamut of the destination device in the device-independent color space using a particular gamut-mapping algorithm for each color region; and
   converting colors in the color gamut of the destination device in the device-independent color space to the color gamut of the destination device in the device-dependent color space.

6. The method of claim 3, further comprising the steps of:
   mapping color information from the color gamut of the source device in the device-independent color space to the at least one optimized intermediate color range using a first gamut-mapping algorithm;
   mapping color information from the at least one optimized intermediate color range to an additional optimized intermediate color range in the device-independent color space using a second gamut-mapping algorithm;
   mapping color information from the additional optimized color range to the color gamut of the destination device in the device-independent color space using a third gamut-mapping algorithm; and
   converting colors in the color gamut of the destination device in the device-independent color space to the color gamut of the destination device in the device-dependent color space.

7. The method of claim 1, wherein the step of determining at least one optimized intermediate color range comprises the steps of:
   determining threshold tolerances for boundary colors based at least in part on pre-determined psychophysical parameters;
   determining a shrunken color boundary;
   collecting gamut/dynamic range data of common source devices;
   finding a maximum color boundary of common source devices; and
   comparing the shrunken color boundary with the maximum color boundary of common source devices to find a minimum color boundary.

8. A system comprising:
a source device;
a multiple-step gamut mapping module, communicatively coupled to the source device, for finding a color gamut of the source device in a device-dependent color space, converting the color gamut of the source device to a device-independent color space, finding a color gamut of a destination device in a device-dependent color space, converting the color gamut of the destination device to a device-independent color space, comparing the color gamut of the source device to the color gamut of the destination device in the device-independent color space, and finding at least one optimized intermediate color range in the device-independent color space, and
a destination device, communicatively coupled to the multiple-step gamut mapping module.

9. The system of claim 8, wherein the source device comprises at least one of a scanner, a digital camera, a printer, a display monitor, a video capable telephone, a television, and a personal digital assistant.

10. The system of claim 8, wherein the destination device comprises at least one of a scanner, a digital camera, a printer, a display monitor, a video capable telephone, a television, and a personal digital assistant.

11. An apparatus comprising:
a device-dependent color gamut;
at least one gamut mapping algorithm, communicatively coupled to the device-dependent color gamut; and
a multiple-step gamut mapping module, communicatively coupled to the device-dependent color gamut and the at least one gamut mapping algorithm, for converting the color gamut of the apparatus to a device-independent color space, finding a color gamut of a destination device in a device-dependent color space, converting the color gamut of the destination device to a device-independent color space, comparing the color gamut of the apparatus to the color gamut of the destination device in the device-independent color space, and finding an optimized intermediate color range in the device-independent color space.

12. An apparatus comprising:
a device-dependent color gamut;
at least one gamut mapping algorithm, communicatively coupled to the device-dependent color gamut; and
a multiple-step gamut mapping module, communicatively coupled to the device-dependent color gamut and the gamut mapping algorithm, for finding a color gamut of a source device in a device-dependent color space, converting the color gamut of the source device to a device-independent color space, converting the color gamut of the apparatus to a device-independent color space, comparing the color gamut of the source device to the color gamut of the apparatus in the device-independent color space, and finding an optimized intermediate color range in the device-independent color space.

13. A computer readable medium comprising computer instructions for:
finding a color gamut of a source device in a device-dependent color space;
converting the color gamut of the source device to a device-independent color space;
finding a color gamut of a destination device in a device-dependent color space;
converting the color gamut of the destination device to a device-independent color space;
comparing the color gamut of the source device to the color gamut of the destination device in the device-independent color space; and
finding at least one optimized intermediate color range in the device-independent color space.

14. The computer readable medium of claim 13, wherein the color gamut of the source device in the device-independent color space is an entry in a predetermined lookup table.

15. The computer readable medium of claim 13, further comprising computer instructions for:
dividing the color gamut of the source device into multiple color regions.

16. The computer readable medium of claim 15, further comprising instructions for performing the steps of:
mapping colors from the color gamut of the source device in the device-independent color space to the at least one optimized intermediate color range using a first gamut-mapping algorithm;
mapping colors inside the at least one optimized intermediate color range to the color gamut of the destination device in the device-independent color using a second gamut-mapping algorithm; and
converting colors in the color gamut of the destination device in the device-independent color space to the color gamut of the destination device in the device-dependent color space.

17. The computer readable medium of claim 15, further comprising computer instructions for:
mapping color information from the color gamut of the source device in the device-independent color space to the at least one optimized intermediate color range using a particular gamut-mapping algorithm for each color region;
mapping color information from the at least one optimized intermediate color range to the color gamut of the destination device in the device-independent color space using a particular gamut-mapping algorithm for each color region; and
converting colors in the color gamut of the destination device in the device-independent color space to the color gamut of the destination device in the device-dependent color space.

18. The computer readable medium of claim 15, further comprising computer instructions for mapping color information from the color gamut of the source device in the device-independent color space to the at least one optimized intermediate color range using a first gamut-mapping algorithm;
mapping color information from the at least one optimized intermediate color range to an additional optimized intermediate color range in the device-independent color space using a second gamut-mapping algorithm;
mapping color information from the additional optimized color range to the color gamut of the destination device in the device-independent color space using a third gamut-mapping algorithm; and
converting colors in the color gamut of the destination device in the device-independent color space to the color gamut of the destination device in the device-dependent color space.

19. The computer readable medium of claim 15, wherein the finding an optimized intermediate color range step comprises:
conducting psychophysical experiments to determine threshold tolerances for boundary colors;

determining a shrunken color boundary;

collecting gamut/dynamic range data of common source devices;

finding a maximum color boundary of common source devices; and comparing the shrunken color boundary with the maximum color boundary of common source devices to find a minimum color boundary.

* * * * *